United States Patent [19]

Canfield et al.

[11] 4,312,657
[45] Jan. 26, 1982

[54] METHOD OF AND APPARATUS FOR SENSING THE LEVEL OF MOLTEN GLASS IN A GLASS MELTING FURNACE

[75] Inventors: Sheldon A. Canfield, Newark; Paul S. Sanik, Westerville, both of Ohio

[73] Assignee: Owens-Corning Fiberglas Corporation, Toledo, Ohio

[21] Appl. No.: 206,809

[22] Filed: Nov. 14, 1980

[51] Int. Cl.³ .............................................. C03B 3/00
[52] U.S. Cl. .................................. 65/29; 65/136; 65/160; 65/162; 65/335
[58] Field of Search .................. 65/29, 134, 136, 160, 65/162, 335

[56] References Cited

U.S. PATENT DOCUMENTS 3,573,017  3/1971  Griem, Jr. ............................ 65/29 X
3,938,976  2/1976  Walker ................................. 65/29
4,002,448  1/1977  Griffith et al. ...................... 65/29

Primary Examiner—Arthur D. Kellogg
Attorney, Agent, or Firm—Ronald C. Hudgens; Patrick P. Pacella; Paul T. Kashimba

[57] ABSTRACT

A method of and apparatus for detecting the level of molten glass in a glass melting furnace comprising: positioning two members in the molten glass in the furnace; supplying a source of alternating current to the members; detecting the impedance of a circuit comprising the two members and the electrical connection therebetween through the molten glass; and generating a signal responsive to the detected impedance as an indication of the level of molten glass in the furnace.

7 Claims, 2 Drawing Figures

METHOD OF AND APPARATUS FOR SENSING THE LEVEL OF MOLTEN GLASS IN A GLASS MELTING FURNACE

BACKGROUND OF THE INVENTION

This invention relates to the production of glass fibers, e.g., fibers made by melting particulate batch ingredients or minerals, including basalt and the like, and, more particularly, to a method of and apparatus for detecting the level of molten glass in a glass melting furnace.

In the production of glass, it is desirable to maintain a substantially constant head or level of molten glass in the melting furnace to reduce the erosion of the refractory and to provide a constant glass feed to the bushings. The prior art has employed bubbler systems, such as those disclosed in Tretheway, U.S. Pat. No. 3,200,971, to detect the level of molten glass in the furnace. However, such systems are not suitable for electric furnaces that have a layer of batch material on the surface of the molten glass, because the bubbles may disturb the batch layer and/or become trapped beneath the bottom of the batch layer and the top surface of the molten glass thereby making the dividing line therebetween indistinct.

Canfield et al., U.S. Pat. No. 4,194,077, provides a method of approximating the level of molten glass in the furnace by measuring the thickness of the batch layer and then subtracting the batch thickness from the level of the batch layer in the tank. However, such method does not directly measure the level of the glass. An ultrasonic sensor detects the level of the batch layer, and a bubbler system detects the level of molten glass in the forehearth of the furnace; this data is then incorporated along with the density of the glass and density of the batch into a formula to calculate the thickness of the batch layer. This thickness is then subtracted from the level of the batch layer detected by the ultrasonic sensor to provide an approximation of the level of molten glass in the furnace.

Therefore, it is an object of the present invention to provide a method of and apparatus for directly detecting the level of molten glass in a furnace having a layer of batch material on the surface of the molten glass.

SUMMARY OF THE INVENTION

In accordance with the present invention, there is provided a method of detecting the level of molten glass in an electric furnace. The method comprises the steps of positioning two members in the molten glass in the furnace, supplying a source of alternating current to the members, detecting the impedance of a circuit comprising the two members and the electrical connection therebetween through the molten glass, and generating a signal responsive to the impedance detected as an indication of the level of molten glass in the furnace.

In addition, the present invention also provides an apparatus for detecting the level of molten glass in a glass melting furnace, such apparatus comprising two members positioned in the molten glass in the furnace, a source of alternating current connected to the members, means for detecting the impedance of a circuit comprising the two members and the connection therebetween through the molten glass and means for providing an output responsive to the detected impedance as an indication of the level of molten glass in the furance.

The present invention consists of essentially a two wire transmission line positioned through the batch cover into the molten glass. Since the glass is conductive in the molten state, it provides a short across the transmission line, the location of which will vary depending upon the level of the molten glass in the furnace. Therefore, the length of the transmission line and the impedance thereof which is dependent upon the length of the transmission line is a function of the level of molten glass in the furnace. The change in glass level can be detected by sensing the change in the impedance of the transmission line.

In the preferred embodiment, the change in impedance is detected by measuring the phase angle relationship between the signal impressed across the transmission line and a reference signal. In addition, in the preferred embodiment, the members of the transmission line are positioned in the furnace such that they are always beneath the upper surface of the batch cover, thereby insuring that the transmission line will constantly be subjected to the same dielectric constant, i.e., the dielectric constant of the batch material, at all times throughout its length. However, the present invention should not be thought of as being limited to a furnace which has a layer of batch material on the surface of the molten glass, since the subject invention also provides an accurate and reliable method of measuring the level of molten glass in combustion fired furnaces that do not have a layer of batch material on the surface of the molten glass.

Other objectives, advantages and applications of the present invention will be made apparent by the following detailed description of the preferred embodiment of the invention.

DETAILED DESCRIPTION OF THE PREFERRED EMBODIMENT

Figure 1:
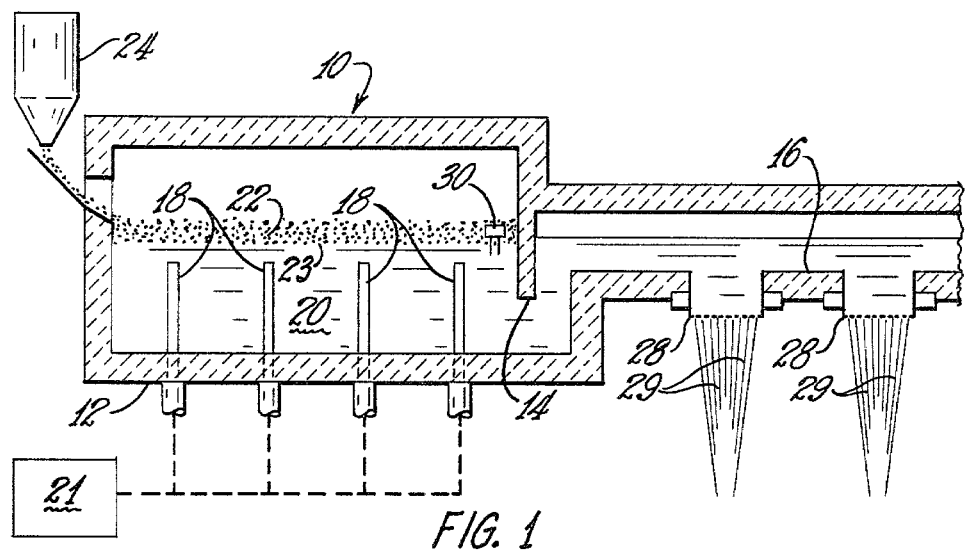
FIG. 1 is a partial schematic view in longitudinal cross section of an electrically operated, glass-melting furnace utilizing the present invention.

Referring to FIG. 1, a glass-melting furnace utilizing the present invention is indicated generally at numeral 10. Furnace 10 has a melting tank 12 from which glass is discharged past a skimmer block 14 to a discharge passage or forehearth 16. A plurality of electrodes 18 extend upwardly through the bottom of melting tank 12. Electrodes 18 are suitably positioned throughout tank 12 in a desired pattern, as is well known in the electrical furnace art, and are supplied with power from a controlled source of power designated generally by 21.

The glass in tank 12 is melted by current flowing between electrodes 18 to form a pool 20 of molten glass. Batch material is provided to furnace 10 by any suitable means, which is indicated generally at 24, to provide a layer or crust 22 of batch material on the surface 23 of pool 20 so that batch layer 22 replenishes the molten glass of pool 20 that flows outwardly through forehearth 16. The molten glass of pool 20 flows under skimmer block 14 and along forehearth 16 to glass fiber production means, such as fiber forming bushings 28, from which glass fibers 29 are attenuated, as is known in the art. The transmission line sensing unit of the present invention, indicated generally by numeral 30, is positioned in melting tank 12.

Furnace 10 is illustrative of one type of furnace for melting glass which incorporates the glass level sensing apparatus of the present invention. Other types of furnaces can also utilize the present invention, for example, an electric arc melting furnace; therefore, the glass melting furnace described herein should be interpreted as exemplary and not in a limiting sense.

Figure 2:
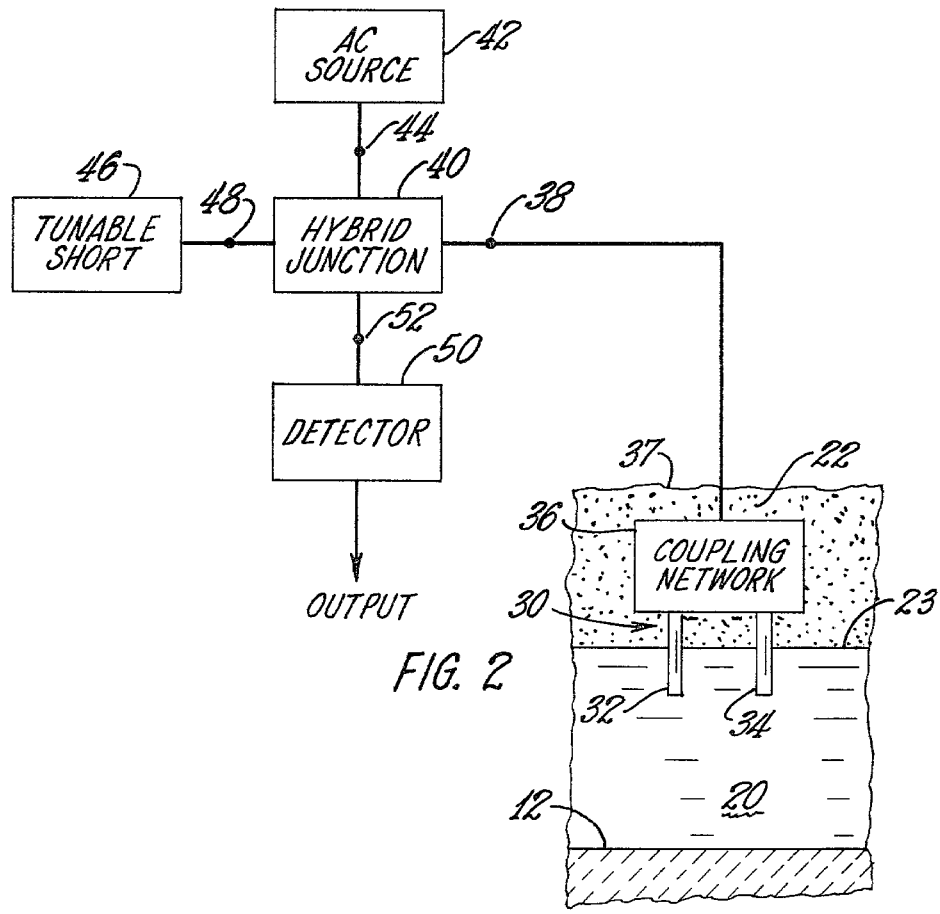
FIG. 2 is a schematic block diagram showing the details of the present invention.

Referring to FIG. 2, the transmission line sensing unit 30 is positioned in melting tank 12 such that transmission line members 32 and 34 are in contact with the pool of molten glass 20 and completely submerged beneath upper surface 37 of batch layer 22. Members 32 and 34 are of sufficient length to ensure that they will always be in contact with the molten glass. Preferably, members 32 and 34 are platinum rods which are dimensioned and spaced to give a characteristic impedance value of between 50 and 300 ohms. A coupling network, such as a balun provided with suitable connectors for attachment to the platinum rods, is connected to members 32 and 34.

Coupling network 36 is connected to port 38 of hybrid tee junction 40 (magic tee). An alternating current source 42 provides an AC signal, e.g., 300 megahertz, to port 44 of hybrid tee 40, and a tunable short 46 is connected to port 48 of hybrid tee 40 to provide a reference load. An amplitude detector 50 is connected to port 52 of hybrid tee 40 to provide a DC signal output indicative of the level of molten glass in the furnace, such signal being suitable for monitoring and/or control purposes.

Alternating current source 42 provides a high frequency signal to hybrid tee 40, which splits the signal and applies it to sensing unit 30 and tunable short 46. The signals reflected from the loads are added and provided to detector 50 at output port 52. During the initial setup of the control system, tunable short 46 is adjusted to provide zero and peak readings at detector 50 for a particular level of molten glass in the furnace. The null point is then set at the midpoint of such range. Accordingly, it can be seen that any change in the level of the molten glass will be indicated by a change in the magnitude of the output signal from detector 50. If desired, a DC offset signal may be applied to detector 50 so that the output signal therefrom is zero at the null point, thus providing an indication of both the magnitude and direction of the change in the level of the molten glass.

If desired, other techniques may be used to measure the impedance of the transmission line to generate a signal indicative of the level of the molten glass. For example, the phase shift in a signal applied across the transmission line and a resistance may be detected.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

We claim:

1. A method of detecting the level of molten glass in a glass melting furnace, said method comprising the steps of: positioning two members in the molten glass in said furnace; supplying a source of alternating current to said members; detecting the impedance of a circuit comprising said two members and the electrical connection therebetween through said molten glass; and generating a signal responsive to the impedance detected as an indication of the level of molten glass in said furnace.

2. A method as recited in claim 1, wherein said positioning step comprises positioning said members such that said members are always located beneath the top surface of the layer of batch material in said furnace.

3. A method as recited in claims 1 or 2, wherein said detecting step comprises detecting the phase angle relationship between the signal impressed across said circuit and a reference signal, and said generating step comprises generating a signal responsive to such phase angle relationship as an indication of the level of molten glass in said furnace.

4. An apparatus for detecting the level of molten glass in a glass melting furnace, said apparatus comprising: two members positioned in the molten glass in said furnace; a source of alternating current connected to said members; and means for detecting the impedance of a circuit comprising said two members and the electrical connection therebetween through said molten glass; and means for providing an output responsive to the detected impedance as an indication of the level of molten glass in said furnace.

5. An apparatus as recited in claim 4, wherein said furnace has a layer of batch material on the surface of the molten glass and said members are positioned such that said members are always located beneath the top surface of said layer of batch material in said furnace.

6. An apparatus as recited in claims 4 or 5, wherein said detecting means comprises means for detecting the phase angle relationship between the signal impressed across said circuit and a reference signal, said phase angle relationship being indicative of the level of molten glass in said furnace.

7. An apparatus as recited in claim 5, wherein each of said members comprises a platinum rod.

* * * * *